(12) United States Patent
Mo et al.

(10) Patent No.: US 10,605,644 B2
(45) Date of Patent: Mar. 31, 2020

(54) COMPLEMENTARY APPARATUS FOR MEASURING UREA WATER LEVEL

(71) Applicant: COAVIS, Sejong-si (KR)

(72) Inventors: Dong Heon Mo, Sejong-si (KR); Jin Hwa Jung, Daejeon (KR); In Seok Sohn, Cheongju-si (KR); Hyun Tae Lee, Sejong-si (KR)

(73) Assignee: COAVIS, Sejong-si (KR)

( * ) Notice: Subject to any disclaimer, the term of this patent is extended or adjusted under 35 U.S.C. 154(b) by 231 days.

(21) Appl. No.: 15/949,669

(22) Filed: Apr. 10, 2018

(65) Prior Publication Data
US 2018/0292249 A1    Oct. 11, 2018

(30) Foreign Application Priority Data

Apr. 11, 2017    (KR) .......................... 10-2017-0046863

(51) Int. Cl.
| | | |
|---|---|---|
| *G01F 23/296* | (2006.01) | |
| *G01F 23/26* | (2006.01) | |
| *G01F 23/00* | (2006.01) | |
| *F01N 3/20* | (2006.01) | |
| *F01N 11/00* | (2006.01) | |

(52) U.S. Cl.
CPC ......... *G01F 23/296* (2013.01); *F01N 3/2066* (2013.01); *F01N 11/00* (2013.01); *G01F 23/0061* (2013.01); *G01F 23/0076* (2013.01); *G01F 23/26* (2013.01); *F01N 2560/12* (2013.01); *F01N 2610/02* (2013.01); *F01N 2610/148* (2013.01); *F01N 2900/1814* (2013.01); *G01F 23/2962* (2013.01)

(58) Field of Classification Search
CPC ......... G01F 23/296–2968; G01F 23/26; G01F 23/22; G01F 23/0061; G01F 23/0069; G01F 23/0076; F01N 11/00; F01N 2900/1814; F01N 2610/148
USPC ............................................. 73/290 V, 304 C
See application file for complete search history.

(56) References Cited

U.S. PATENT DOCUMENTS

| | | | |
|---|---|---|---|
| 9,465,000 B1 * | 10/2016 | Brown ................. | G01N 27/026 |
| 2010/0024545 A1 * | 2/2010 | Rudd ...................... | G01F 23/70 |
| | | | 73/313 |

(Continued)

FOREIGN PATENT DOCUMENTS

| | | |
|---|---|---|
| KR | 10-1323399 | 10/2013 |
| KR | 10-1584634 | 1/2016 |

*Primary Examiner* — Nathaniel J Kolb
(74) *Attorney, Agent, or Firm* — Hauptman Ham, LLP (57) ABSTRACT

Provided is a complementary apparatus for measuring a level of urea water includes an ultrasonic measurement unit installed inside a urea water tank to measure a level of urea water using an ultrasonic wave, an inductance measurement unit including a winding coil wound in a vertical direction inside the urea water tank and having a winding density varied toward one side, and measuring a level of urea water using inductance measured as a current is applied to the winding coil, a temperature measurement unit installed in the urea water tank and measuring a temperature, and a controller determining whether to operate the ultrasonic measurement unit or the inductance measurement unit according to the temperature measured by the temperature measurement unit or selectively outputting a level of urea water measured by the ultrasonic measurement unit and the inductance measurement unit.

7 Claims, 5 Drawing Sheets

(56) References Cited

U.S. PATENT DOCUMENTS

| | | | | |
|---|---|---|---|---|
| 2012/0118059 A1* | 5/2012 | Reimer | ................ | F01N 3/2066 73/290 V |
| 2013/0074590 A1* | 3/2013 | Bertow | ................ | F01N 3/2066 73/114.71 |
| 2014/0366512 A1* | 12/2014 | Hodgson | ............... | F01N 3/2066 60/286 |
| 2016/0161309 A1* | 6/2016 | Yoon | ....................... | G01F 1/007 73/861.18 |
| 2019/0204135 A1* | 7/2019 | Lee | ..................... | G01F 23/2962 |

\* cited by examiner

COMPLEMENTARY APPARATUS FOR MEASURING UREA WATER LEVEL

CROSS-REFERENCE TO RELATED APPLICATIONS

This application claims priority under 35 U.S.C. § 119 to Korean Patent Application No. 10-2017-0046863, filed on Apr. 11, 2017, in the Korean Intellectual Property Office, the disclosure of which is incorporated herein by reference in its entirety.

TECHNICAL FIELD

The following disclosure relates to a complementary apparatus for measuring a urea water level, and more particularly, to a complementary apparatus for measuring a level of urea water, devised to use a plurality of measurement schemes complementary to each other to complement a related art apparatus for measuring a level of urea water which may malfunction in a specific environment.

BACKGROUND

As an environmental pollution problem has emerged as a major social issue, exhaust gas regulations for internal-combustion engine automobiles using fossil fuel has become tightened. In particular, an exhaust gas emitted from automobiles using diesel fuel contains nitrogen oxides (NOx). Since nitrogen oxides may cause acid rain or severe respiratory problems, tough emission standards of nitrogen oxides included in exhaust gases are applied in all over the world.

A selective catalyst reduction (SCR) method and an exhaust gas recirculation (EGR) apparatus are widely used to remove nitrogen oxides contained in exhaust gases. In the SCR method, a nitrogen oxide in an exhaust gas is removed by reducing the nitrogen oxide to nitrogen and water using urea water as a catalyst.

Since the SCR method uses urea water as a catalyst, a tank for storing urea water and a device for supplying urea water stored in the tank to an exhaust gas are required in an automobile. The amount of urea water stored in the tank is about 5 to 7% of the amount of fuel. Urea water stored in the tank continues to be used to remove nitrogen oxides so urea water needs to be periodically charged, and thus, in order to measure a remaining amount of urea water, a device which may be installed in the tank to measure a level of urea water is required.

Conventionally, there are two methods of measuring a level of urea water: One is a method of measuring electric conductivity varied according to levels of urea water and the other is a method of using an ultrasonic wave. The related art method using electric conductivity is disclosed in Korean Patent Registration No. 10-1584634 ("Urea water level measuring apparatus" published on Jan. 6, 2016, referred to as Related Art 1 hereinafter) and the related art method using ultrasonic waves is disclosed in Korean Patent Registration No. 10-1323399 ("Urea water level measuring apparatus using ultrasonic level sensor", published on Oct. 23, 2013, referred to as Related Art 2 hereinafter).

The method of measuring electric conductivity, that is, inductance, disclosed in Related Art 1 has a problem in that a measurement value is inaccurate when urea water is changed into bubbles, and the ultrasonic method used in Related Art 2 has a problem in that a measured level of urea water is inaccurate when urea water is exposed to low temperatures and freezes.

RELATED ART DOCUMENT

Patent Document

1. Korean Patent Registration No. 10-1584634 ("Urea water level measuring apparatus" published on Jan. 6, 2016
2. Korean Patent Registration No. 10-1323399 ("Urea water level measuring apparatus using ultrasonic level sensor", published on Oct. 23, 2013

SUMMARY

An embodiment of the present invention is directed to providing a complementary apparatus for measuring a level of urea water, whereby different urea water level measurement methods are used according to specific environments in measuring a level of urea water to thus obtain high accuracy and reliability of measurement of a level of urea water.

In one general aspect, a complementary apparatus for measuring a level of urea water includes: an ultrasonic measurement unit installed inside a urea water tank to measure a level of urea water using an ultrasonic wave; an inductance measurement unit including a winding coil wound in a vertical direction inside the urea water tank and having a winding density varied toward one side, and measuring a level of urea water using inductance measured as a current is applied to the winding coil; a temperature measurement unit installed in the urea water tank and measuring a temperature; and a controller determining whether to operate the ultrasonic measurement unit or the inductance measurement unit according to the temperature measured by the temperature measurement unit or selectively outputting a level of urea water measured by the ultrasonic measurement unit and the inductance measurement unit.

When the temperature measured by the temperature measurement unit is equal to or lower than a first reference temperature, the controller may operate the inductance measurement unit and may not operate the ultrasonic measurement unit, or output a level of urea water measured by the inductance measurement unit.

When the temperature measured by the temperature measurement unit is higher than the first reference temperature, the controller may operate the ultrasonic measurement unit and may not operate the inductance measurement unit, or output a level of urea water measured by the ultrasonic measurement unit.

When the temperature measured by the temperature measurement unit is higher than a first reference temperature, the controller may operate the ultrasonic measurement unit and the inductance measurement unit, when a difference between a first level of urea water measured by the ultrasonic measurement unit and a second level of urea water measured by the inductance measurement unit is within a reference error, the controller may output an average value of the first and second levels of urea water, and when the difference between the first level of the urea water and the second level of urea water is greater than the reference error, the controller may output only the first level of urea water.

When the temperature measured by the temperature measurement unit is higher than a second reference temperature higher than the first reference temperature, the controller may operate the ultrasonic measurement unit and may not operate the inductance measurement unit, or output the level of urea water measured by the ultrasonic measurement unit.

The ultrasonic measurement unit may include: a concentration measurement unit installed in a lower portion of the urea water tank and measuring a concentration of urea water; and a water level measurement unit installed on a lower surface of the urea water tank, emitting ultrasonic waves toward a surface of urea water, receiving a reflected ultrasonic wave, and measuring time taken for receiving the reflected ultrasonic wave after the ultrasonic wave was emitted to measure a level of the urea water.

The inductance measurement unit may further include: a tube having a shape with opposing sides open, installed in a height direction of the urea water tank inside the urea water tank, and including a plurality of protrusions spaced apart from each other by a predetermined distance in a direction in which the plurality of protrusions extend from an outer surface thereof such that the winding coil is wound therearound; and an inductance converter converting inductance of the winding coil changing according to a change in a level of urea water accommodated in the urea water tank, into a level of urea water.

Other features and aspects will be apparent from the following detailed description, the drawings, and the claims.

DETAILED DESCRIPTION OF EXEMPLARY EMBODIMENTS

The advantages, features and aspects of the present invention will become apparent from the following description of the exemplary embodiments with reference to the accompanying drawings, which is set forth hereinafter. The present invention may, however, be embodied in different forms and should not be construed as limited to the exemplary embodiments set forth herein. Rather, these exemplary embodiments are provided so that this disclosure will be thorough and complete, and will fully convey the scope of the present invention to those skilled in the art. The terminology used herein is for the purpose of describing particular exemplary embodiments only and is not intended to be limiting of example exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a complementary apparatus for measuring a level of urea water according to the present invention will be described in detail with reference to the accompanying drawings.

Figure 1:
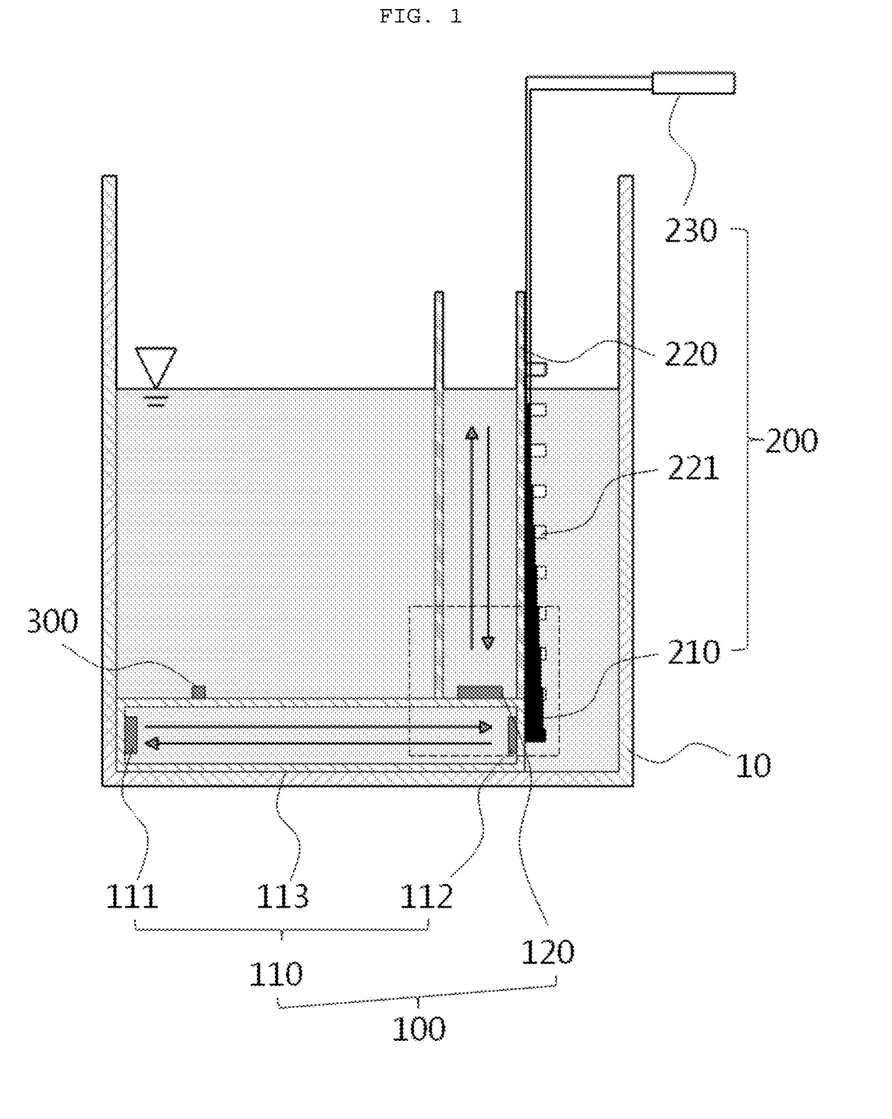
FIG. 1 is a schematic view of the present disclosure.

FIG. 1 is a view illustrating a complementary apparatus for measuring a level of urea water according to an exemplary embodiment. As illustrated in FIG. 1, the complementary apparatus for measuring a level of urea water according to the present invention includes an ultrasonic measurement unit 100, an inductance measurement unit 200, a temperature measurement unit 300, and a controller.

The ultrasonic measurement unit 100 is installed inside a urea water tank 10 and measures a level of urea water using an ultrasonic wave. As illustrated in FIG. 1, the ultrasonic measurement unit 100 may include a concentration measurement unit 110 and a water level measurement unit 120.

The concentration measurement unit 110 is installed in a lower portion of the urea water tank 10 to measure a concentration of urea water. The reason why the concentration measurement unit 110 measures the concentration of urea water is because a value as a reference is required when the water level measurement unit 120 measures a level of urea water. Urea water is produced by mixing urea with water, and a speed at which ultrasonic waves travel varies according to concentrations of urea included in urea water. In general, a concentration of urea included in urea water accounts for 32.5% of the mass of the urea water. However, the concentration of urea water may vary according to environments of the urea water tank 10, and thus, in order to more accurately measure a concentration of urea water, the concentration measurement unit 110 measures a concentration of urea of urea water at all times and the water level measurement unit 120 (to be described hereinafter) measures a level of urea water in relation to the measured concentration urea of urea water.

As described above, in order to measure the concentration of urea water, the concentration measurement unit 110 is located in a lower portion of the urea water tank 10 and submerged in urea water to measure the concentration of the urea water in the state of being submerged in urea water. The concentration measurement unit 110 includes an ultrasonic sensor 111 transmitting and receiving an ultrasonic wave and a reflector 112 spaced apart from the ultrasonic sensor 111 by a predetermined distance.

As illustrated in FIG. 1, the ultrasonic sensor 111 and the reflector 112 may be installed inside the case 113 to prevent the urea water tank 10 from wobbling or bubbles from being generated in urea water to some extent. The case 113 may have an inlet serving not completely isolating the inside thereof in which the ultrasonic sensor 111 and the reflector 112 are accommodated and the outside thereof and provided on an outer surface thereof to allow urea water to be introduced into the case 113 therethrough.

An ultrasonic wave transmitted from the ultrasonic sensor 111 travels to the reflector 112 and is reflected from the reflector 112. The ultrasonic wave reflected from the reflector 112 travels to the ultrasonic sensor 111 and is received by the ultrasonic sensor 111. A distance between the ultrasonic sensor 111 and the reflector 112 is determined in advance, and thus, an internal propagation speed of the ultrasonic wave in urea water may be obtained by dividing two times as much as the distance over which the ultrasonic wave traveled between the ultrasonic sensor 111 and the reflector 112 by time taken for the ultrasonic sensor 111 to transmit and receive the ultrasonic wave, and a concentration of urea water may be calculated through the propagation speed.

The propagation speed of the ultrasonic wave obtained by the concentration measurement unit 110 may be used for the water level measurement unit 120 (to be described hereinafter) to measure a level of urea water and the obtained concentration of urea water may be used to calculate a temperature at which urea water freezes, may be used in other device, or may be output to a separate device.

The water level measurement unit 120 is installed inside the urea water tank 10, transmits an ultrasonic wave toward a surface of urea water, receives an ultrasonic wave reflected from the surface of urea water, and subsequently measures time taken for transmission and reception of the ultrasonic wave to measure a level of urea water. The water level measurement unit 120 may be an ultrasonic sensor capable of transmitting and receiving ultrasonic waves, like the ultrasonic sensor 111, and may calculate a distance between the water level measurement unit 120 and the surface of urea water through the time during which the ultrasonic wave was transmitted and received and the speed of the ultrasonic wave obtained from the concentration measurement unit 110, and obtain a level of urea water by adding the distance between the water level measurement unit 120 and the urea water tank 10 to the calculated distance, like the ultrasonic sensor.

The water level measurement unit 120 may be located inside the tube 220 included in the inductance measurement unit 200 (to be described later) to increase signal sensitivity of the water level measurement unit 120. Details of the water level measurement unit 120 will be described together with the tube 220.

The inductance measurement unit 200 measures a level of urea water accommodated in the urea water tank 10 using inductance which is measured to be different according to levels of urea water. The inductance measurement unit 200 may include a winding coil 210, the tube 220 and an inductance converter 230.

As illustrated in FIG. 1, the tube 220 is vertically installed inside the urea water tank 10 in which both upper and lower sides are open. Since both upper and lower sides are open, urea water is introduced to the inside of the tube 220 and pressure inside the tube 220 is equal to that of the outside of the tube 220, that is, inside the urea water tank 10, and thus, levels of urea water inside and outside the tube 220 may be equal.

In an exemplary embodiment illustrated in FIG. 1, a lower end of the tube 220 is coupled to an upper surface of the case 113. In this case, urea water may not flow to the inside of the tube 220. Thus, in order to prevent this, an inlet may be provided on an outer surface of the tube 220 in a penetrating manner such that urea water may be introduced into the tube 220.

The reason why the water level measurement unit 120 is accommodated in the tube 220 is because a tubular shape like the tube has a limited internal area. Since the internal area of the tube 220 is small, although the urea water tank 10 wobbles, the surface of urea water accommodated in the tube 220 wobbles less than the surface of urea water accommodated in the urea water tank 10. Therefore, a measurement value of the level of urea water measured by the water level measurement unit 120 may be more accurately measured. Further, since the tube 220 has a container-like shape in the inner surface and does not have a depressed portion, a through portion, or a protruding portion, sensitivity of ultrasonic waves transmitted and received by the water level measurement unit 120 may be increased.

Figure 2:
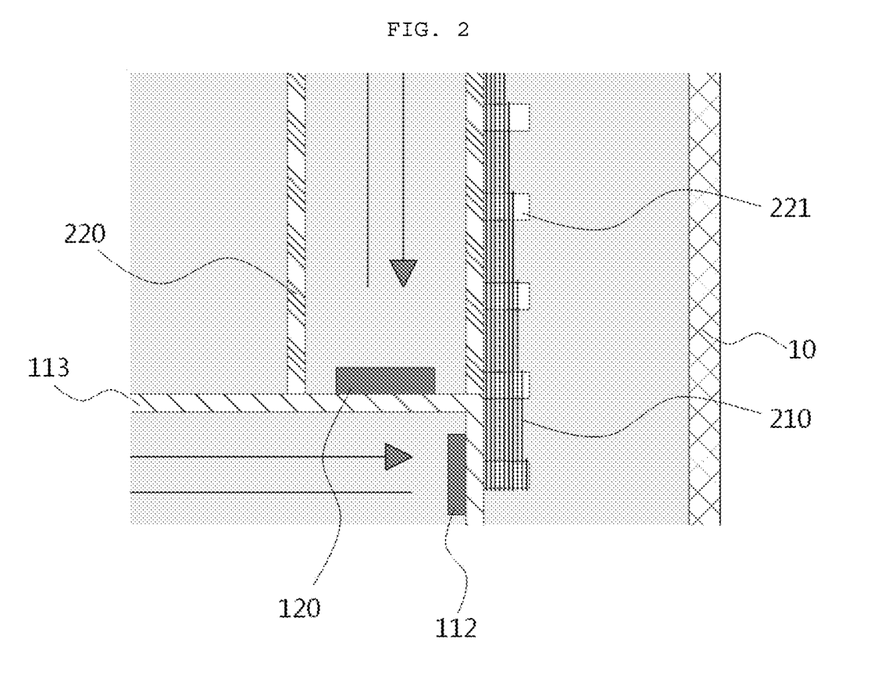
FIG. 2 is a partially enlarged view of FIG. 1.

As illustrated in FIGS. 1 and 2, protrusions 221 are repeatedly provided and spaced apart from each other at a predetermined interval on an outer surface of the tube 220 in a height direction, that is, in a vertical direction. The protrusions 221 serve to allow the winding coil 210 to be wound therearound. The winding coil 210 may be wound around each of the protrusions 221 so that winding density is varied toward the one side. In the exemplary embodiment illustrated in FIGS. 1 and 2, the winding density of the winding coil 210 is higher at a lower side and lowered upwards.

The inductance converter 230 continues to apply a current to the winding coil 210 and converts inductance of the winding coil 210 which changes according to changes of the level of urea water accommodated in the urea water tank 10, into a level of urea water. When the winding coil 210 is submerged in urea water by a predetermined height, the current flowing in the winding coil 210 changes to cause magnetic flux penetrating through the winding coil 210 to be changed to cause electromagnetic induction to generate induced electromagnetic force interfering with the change in the current flowing in the winding coil 210, which is called inductance. The inductance converter 230 measures the inductance, and measured inductance is increased, according to a degree to which the winding coil 210 is submerged in urea water, that is, as the level of urea water is increased, and decreased as the level of urea water is lowered, and thus, the inductance value measured by the inductance converter 230 may be converted into a level of urea water.

The method of measuring the level of urea water using the ultrasonic waves and inductance respectively used in the ultrasonic measurement unit 100 and the inductance measurement unit 200 has a drawback in a low temperature environment or in a situation in which bubbles are generated as described above in the background, making it difficult to accurately measure a level of urea water. Thus, in an exemplary embodiment, the drawback may be overcome by selectively operating the ultrasonic measurement unit 100 and the inductance measurement unit 200 through the temperature measurement unit and the controller as described hereinafter.

The temperature measurement unit 300 is installed inside the urea water tank 10 to measure a temperature. The temperature measurement unit 300 may be a generally used temperature sensor, and an operation of the ultrasonic measurement unit 100 and the inductance measurement unit 200 is determined on the basis of a temperature of the urea water tank 10 measured by the temperature measurement unit 300.

The controller determines whether to operate the ultrasonic measurement unit 100 or the inductance measurement unit 200 according to a temperature measured by the temperature measurement unit 300 or determines whether to utilize values measured by the ultrasonic measurement unit 100 and the inductance measurement unit. Thus, there may be various exemplary embodiments according to ways in which the controller controls operations of the ultrasonic measurement unit 100 and the inductance measurement unit 200, and some of the exemplary embodiments will be described.

First Operation Example

Figure 3:
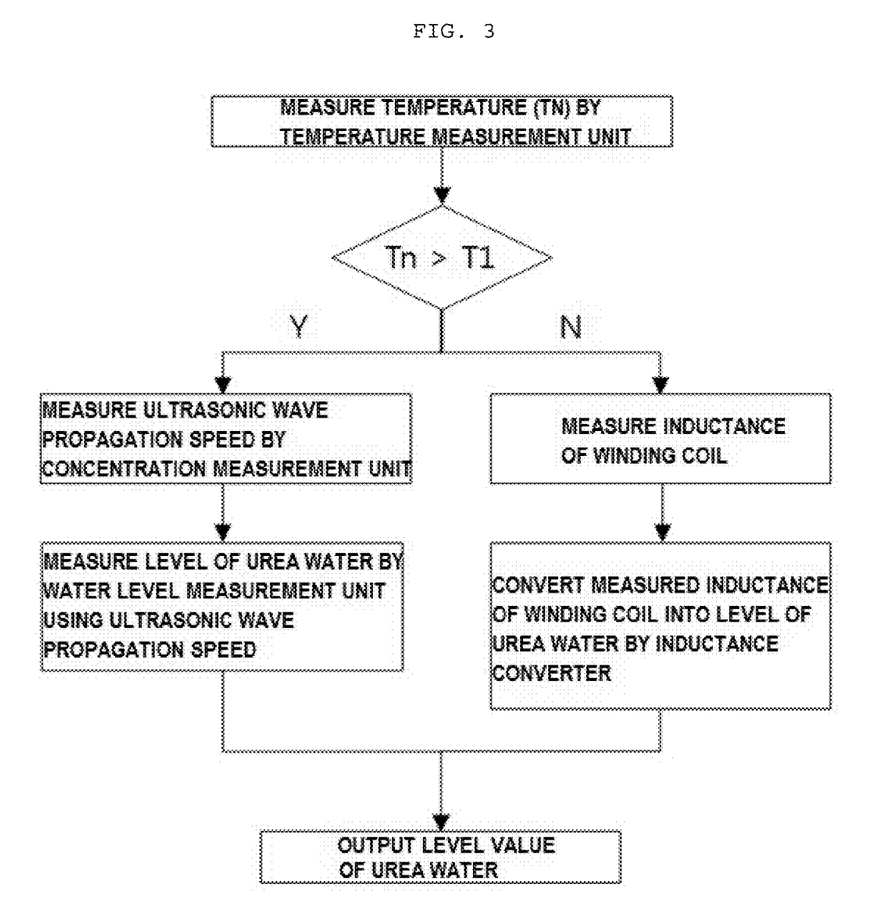
FIG. 3 is a flowchart of a first operation example of the present disclosure.

In the first operation example of the ultrasonic measurement unit 100 and the inductance measurement unit 200, operations of the ultrasonic measurement unit 100 and the inductance measurement unit 200 are determined by the controller on the basis of a temperature at which urea water freezes. That is, in the first operation example, a temperature measured by the temperature measurement unit 300 and a first reference temperature (i.e., the temperature at which urea water freezes, which is referred to as 'T1' hereinafter) are compared, and a case where the temperature measured by the temperature measurement unit 300 is equal to or lower than T1 and a case where the temperature measured by the temperature measurement unit 300 exceeds T1 are distinguished from each other, and whether to operate the ultrasonic measurement unit 100 or the inductance measurement unit 200 is selectively determined according to situations.

FIG. 3 is a schematic diagram of the first operation example. As illustrated in FIG. 3, when the temperature measured by the temperature measurement unit 300 is equal to or lower than T1, the controller operates only the inductance measurement unit 200, and when the temperature measured by the temperature measurement unit 300 exceeds T1, the controller operates only the ultrasonic measurement unit 100.

When the controller controls the operations of the ultrasonic measurement unit 100 and the inductance measurement unit 200, freezing of urea water or generation of bubbles, the drawback of the measurement method using ultrasonic waves and inductance, may be solved and reliability of a level of urea water measured by the apparatus for measuring a urea water level may be increased.

In the first operation example described above, the controller controls whether to operate the ultrasonic measurement unit 100 and the inductance measurement unit 200, separately. Alternatively, the controller may operate both the ultrasonic measurement unit 100 and the inductance measurement unit 200, regardless of a temperature measured by the temperature measurement unit 300, and here, the controller may output or use only a measurement value (level of urea water) of one selected from among the ultrasonic measurement unit 100 and the inductance measurement unit 200 according to temperatures measured by the temperature measurement unit 300, and also, similarly, in another operation example, in case where it is described that only any one of the ultrasonic measurement unit 100 and the inductance measurement unit 200 operates, the controller may output or use only a level of urea water measured by any one of the ultrasonic measurement unit 100 and the inductance measurement unit 200 which operates.

Second Operation Example

Figure 4:
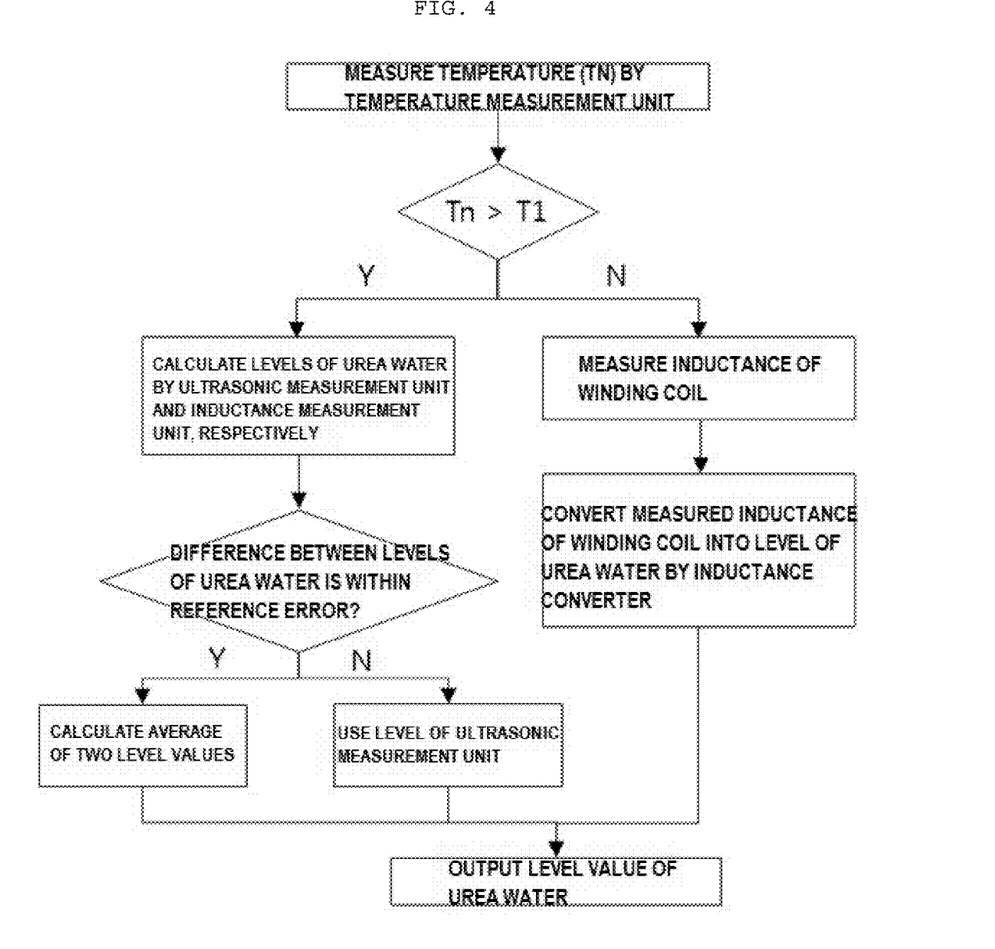
FIG. 4 is a flowchart of a second operation example of the present disclosure.

FIG. 4 shows a flowchart of a second operation example of the present disclosure. As illustrated in FIG. 4, in the second operation example of the present disclosure, when a temperature measured by the temperature measurement unit 300 is equal to or lower than T1, the controller operates only the inductance measurement unit 200, like the first operation example.

The second operation example of the present invention differs from the first operation example when a temperature measured by the temperature measurement unit 300 is higher than T1. Bubbles that occur in urea water, which is a drawback of the measurement method using inductance, are generated when a temperature is very high or when urea water wobbles. Bubbles do not always occur when the temperature measured by the temperature measurement unit 300 is higher than the reference temperature.

Thus, in the second operation example of the present disclosure, when the temperature measured by the temperature measurement unit 300 is higher than T1, the controller simultaneously operates the ultrasonic measurement unit 100 and the inductance measurement unit 200, and when a difference between level values of urea water measured by the ultrasonic measurement unit 100 and the inductance measurement unit 200 is within a reference error, the controller outputs an average value of the levels measured by the ultrasonic measurement unit 100 and the inductance measurement unit 200.

When the difference between the level values measured by the ultrasonic measurement unit 100 and the inductance measurement unit 200 is greater than the reference error, the controller determines that bubbles are generated in urea water and uses only the level of urea water measured by the ultrasonic measurement unit 100 without using the level of urea water measured by the inductance measurement unit 200.

In the second operation example of the present disclosure, since the ultrasonic measurement unit 100 and the inductance measurement unit 200 are simultaneously used in a specific situation and the average value of the measured values is output, an accurate level of urea water, i.e., an accurate remaining amount of urea water, may be measured, and since both the ultrasonic measurement unit 100 and the inductance measurement unit 200 operate, although any one is broken down, the other may be used to measure a level of the urea water, and thus, device reliability may be increased.

Third Operational Embodiment

Figure 5:
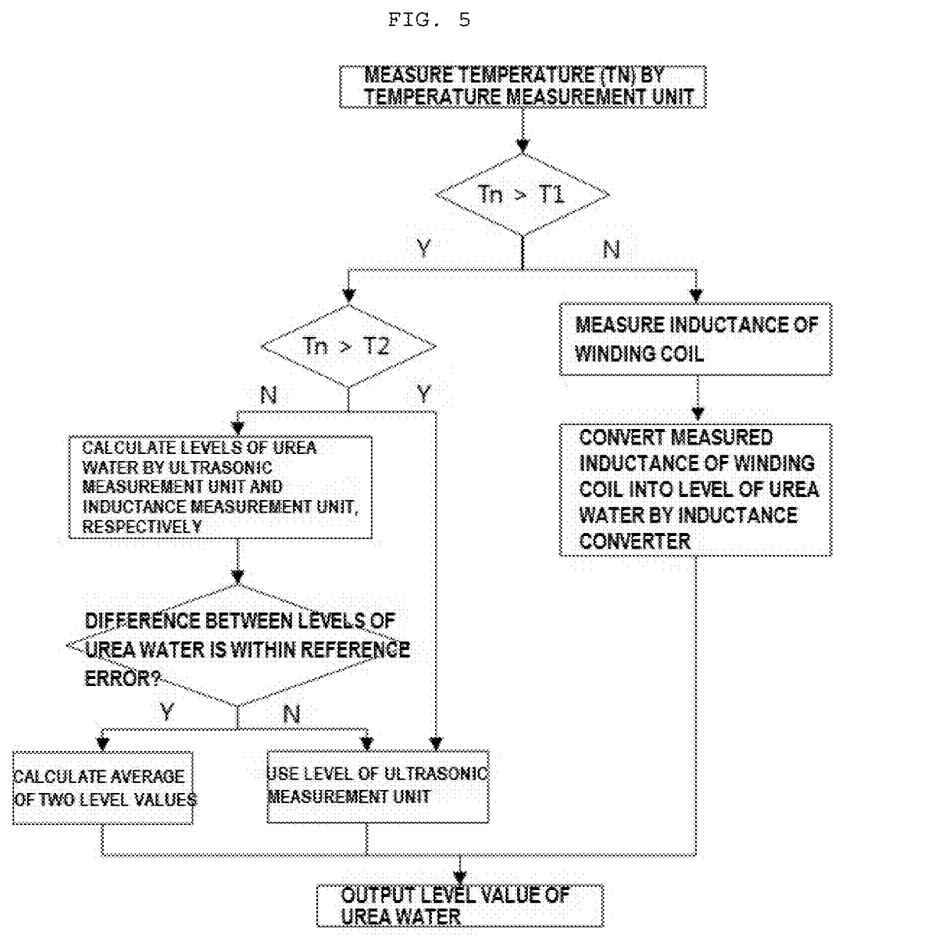
FIG. 5 is a flowchart of a third operation example of the present disclosure.

FIG. 5 is a flowchart of a third operation example of the present disclosure. In the third operation example of the present disclosure, a section in which operations of the ultrasonic measurement unit 100 and the inductance measurement unit 200 are controlled by the controller is divided into three sections, and reference temperatures are T1 and a temperature (hereinafter, 'T2') at which bubbles are frequently generated, which is higher than T1.

When the temperature measured by the temperature measurement unit 300 is equal to or lower than T1, the controller operates only the inductance measurement unit 200. When the temperature measured by the temperature measurement unit 300 falls between T1 and T2, the controller simultaneously operates the ultrasonic measurement unit 100 and the inductance measurement unit 200 and outputs an average of the levels of urea water respectively measured by the ultrasonic measurement unit 100 and the inductance measurement unit 200, and when a difference between the two measured values is greater than the reference error, the controller outputs only the level of urea water measured by the ultrasonic measurement unit 100, like the second operation example. The above-mentioned two sections (section equal to or lower than T1 and section between T1 and T2) are the same as those in the second operation example.

When the temperature measured by the temperature measurement unit 300 is equal to or higher than T2, the controller may determine that urea water has high frequency of bubble generation, and operate only the ultrasonic measurement unit 100. T2 may be determined experimentally through repeated experiments and may be changed according to environments and user's intention.

According to the complementary apparatus for measuring a level of urea water in exemplary embodiments of the present disclosure, when a temperature of the urea water tank is equal to or lower than a temperature at which urea water freezes, a level of urea water is measured by the inductance method, and when the temperature of the urea water tank exceeds the temperature at which urea water freezes, the level of urea water is measured by the ultrasonic method, whereby the drawbacks of the inductance and the ultrasonic measurement methods are solved to increase reliability of the measured level value of urea water.

What is claimed is:

1. A complementary apparatus for measuring a level of urea water, the complementary apparatus comprising:
    an ultrasonic measurement unit installed inside a urea water tank to measure a level of urea water using an ultrasonic wave;
    an inductance measurement unit including a winding coil wound in a vertical direction inside the urea water tank and having a winding density varied toward one side, and measuring a level of urea water using inductance measured as a current is applied to the winding coil;
    a temperature measurement unit installed in the urea water tank and measuring a temperature; and
    a controller determining whether to operate the ultrasonic measurement unit or the inductance measurement unit according to the temperature measured by the temperature measurement unit or selectively outputting a level of urea water measured by the ultrasonic measurement unit and the inductance measurement unit.

2. The complementary apparatus of claim 1, wherein when the temperature measured by the temperature measurement unit is equal to or lower than a first reference temperature, the controller operates the inductance measurement unit and does not operate the ultrasonic measurement unit, or outputs the level of urea water measured by the inductance measurement unit.

3. The complementary apparatus of claim 1, wherein when the temperature measured by the temperature measurement unit is higher than a first reference temperature, the controller operates the ultrasonic measurement unit and does not operate the inductance measurement unit, or outputs the level of urea water measured by the ultrasonic measurement unit.

4. The complementary apparatus of claim 1, wherein when the temperature measured by the temperature measurement unit is higher than a first reference temperature, the controller operates the ultrasonic measurement unit and the inductance measurement unit, when a difference between a first level of urea water measured by the ultrasonic measurement unit and a second level of urea water measured by the inductance measurement unit is within a reference error, the controller outputs an average value of the first and second levels of urea water, and when the difference between the first level of urea water and the second level of urea water is greater than the reference error, the controller outputs only the first level of urea water.

5. The complementary apparatus of claim 4, wherein when the temperature measured by the temperature measurement unit is higher than a second reference temperature higher than the first reference temperature, the controller operates the ultrasonic measurement unit and does not operate the inductance measurement unit, or outputs the level of urea water measured by the ultrasonic measurement unit.

6. The complementary apparatus of claim 1, wherein the ultrasonic measurement unit includes:
    a concentration measurement unit installed in a lower portion of the urea water tank and measuring a concentration of urea water; and
    a water level measurement unit installed on a lower surface of the urea water tank, emitting ultrasonic waves toward a surface of urea water, receiving a reflected ultrasonic wave, and measuring time taken for receiving the reflected ultrasonic wave after the ultrasonic wave was emitted to measure a level of the urea water.

7. The complementary apparatus of claim 1, wherein the inductance measurement unit further includes:
    a tube having a shape with opposing sides open, installed in a height direction of the urea water tank inside the urea water tank, and including a plurality of protrusions spaced apart from each other by a predetermined distance in a direction in which the plurality of protrusions extends from an outer surface such that the winding coil is wound therearound; and
    an inductance converter converting inductance of the winding coil changing according to a change in a level of urea water accommodated in the urea water tank, into a level of urea water.

* * * * *